Patented Sept. 12, 1939

2,172,979

UNITED STATES PATENT OFFICE 2,172,979

SOLDERING AGENT

Fritz Köhler, Eduard Rouette, and Wilhelm Standop, Bonn-on-the-Rhine, Germany

No Drawing. Application April 1, 1939, Serial No. 265,546. In Germany April 28, 1938

6 Claims. (Cl. 148—23)

This invention relates to an improvement in, or modification of, the soldering agent for the soft soldering of aluminium and aluminum alloys which is described and claimed in U. S. Patent 2,155,307.

This patent relates to a soldering agent for soft soldering aluminum which consists of the complex combination of a hydrohalide of a hydrogen-rich organic amine base with a halide of tetravalent tin. This soldering agent has the great advantage over the simple hydrohalides of hydrogen-rich organic amine bases that it is extraordinarily stable towards moisture of the air, since the halogen in this combination is split off not as halogen ion, which decomposes the zinc of the solder dust to zinc halide, but in the form of the ion of a tin halogen acid which behaves inactively towards the metal dust of an aluminum soft solder paste.

All hydrohalides, that is to say the hydrochloride, hydrobromide, hydroiodide and hydrofluoride, of the hydrogen-rich organic amine bases come into question as components of the complex salt formation, as well as all four stannic halides (stannic chloride, stannic bromide, stannic iodide, stannic fluoride).

For example, an amine base hydrobromide may be united with stannic bromide to form the base salt of bromstannic acid, that is to say a bromstannate, or it may be united with stannic chloride, stannic iodide or stannic fluoride, when complex salts of mixed halogen stannic acids are formed, that is to say a base dibromotetrachlorostannate, or a dibromotetraiodo-stannate, etc.

The complex salt formation may be demonstrated by the following scheme:

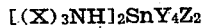

[(X)₃NH]₂SnY₄Z₂ in which X is a hydrogen-rich organic residue, and Y and Z are any desired halogen atoms. Of course Y and Z may also be the same halogen atoms.

The complex salts just mentioned have a very low melting point and have an extraordinary strong solvent action on aluminum oxide. The tin contained in them they deposit during the soldering operation and form tinned surfaces on the bare aluminum.

It has now been found that if one of the said complex salts is mixed with anhydrous tin dihalide, more particularly stannous chloride, and zinc halide, more particularly zinc chloride, surprisingly enough a soldering agent is obtained which is outstandingly suitable for the soldering of magnesium-containing aluminum alloys.

When using the mixture according to the invention, after the complex salt has removed the oxide skin an alloy of tin and zinc separates out by interchange action with the aluminum which makes the soldered joint. The aluminum halide or magnesium halide forming during the interaction is taken up by the undecomposed complex salt and is completely vapourised with the same.

Consequently no slag containing aluminum halide or magnesium halide remains at the soldering place, so that corrosion as a result of such salt residues is excluded. The magnesium halide, more particularly magnesium chloride, therefore in the case of the soldering agent according to the invention no longer checks the soldering operation in the form of a solid separation as in the case of the known soldering mixtures and does not prevent the diffusion of the soldering metal formed into the surface of the alloy.

The mixture according to the invention, which may contain water-sensitive salts such as stannous chloride and zinc chloride, may in such cases be protected from the influence of the atmosphere by rubbing up the mixture with a water-repelling organic oil, such as paraffin oil, vaseline or the like.

The mixture proportions between zinc halide and stannous halide may be varied within wide limits without impairing the efficiency of the soldering agent. For example a ratio of zinc chloride to stannous chloride equal to 14.5:85.5 parts by weight has proved to be particularly favourable because from such a mixture the eutectic tin-zinc alloy with the lowest melting point separates out.

The soldering agent provided by the invention solders even aluminum alloys with comparatively high magnesium contents without the smallest difficulty.

In the following examples all the parts are parts by weight.

*Example I*

33 parts of triethylamine-chlorostannate,
67 parts of a mixture of 14.5 parts of zinc chloride and 85.5 parts of stannous chloride.

According to a further characteristic of the present invention the mixture according to the invention may also have added thereto dehydrated halides of metals which are more noble than the aluminum, or magnesium-containing aluminum, to be soldered. For example lead chloride (PbCl₂), cadmium chloride (CdCl₂), antimony trichloride (SbCl₃) and bismuth trichloride (BiCl₃) have proved to be suitable.

By means of the additions just mentioned, it is possible to vary the position of the melting point for example of the reduced metal within wide limits, which is very advantageous in many cases.

*Example II*

35 parts of triethylamine-chlorostannate are intimately rubbed with 65 parts of the following four mixtures:

1

| | Parts |
|---|---|
| Stannous chloride | 85.5 |
| Zinc chloride | 7.5 |
| Lead chloride (PbCl₂) | 7.0 |

2

| | |
|---|---|
| Stannous chloride | 85.5 |
| Zinc chloride | 7.5 |
| Cadmium chloride | 7.0 |

3

| | |
|---|---|
| Stannous chloride | 85.5 |
| Zinc chloride | 7.5 |
| Antimony trichloride | 7.0 |

4

| | |
|---|---|
| Stannous chloride | 85.5 |
| Zinc chloride | 7.5 |
| Bismuth trichloride | 7.0 |

What we claim is:

1. A soldering composition for the soft soldering of aluminum and particularly magnesium aluminum alloys comprising a complex salt containing a stannic halide and hydrohalide of a hydrogen rich amine base in reactive combination with at least one stannous halide and at least one zinc halide, said complex salt being adapted to form during the soldering procedure a vaporizable compound and a joint creating tin-zinc alloy with the light metal halide produced by the action of said complex salt upon the light metal.

2. A soldering composition according to claim 1 characterized therein that in using stannous chloride and zinc chloride the ratio of these two substances is 85.5 to 14.5 parts by weight.

3. A soldering composition according to claim 1 characterized by the addition of a water repelling organic oil and preferably paraffin oil or vaseline.

4. In a soldering composition according to claim 1 the complex salt being triethylamino chlorostannate.

5. A soldering composition according to claim 1 characterized by the further addition of at least one dehydrated halide of a metal selected from the group consisting of lead, cadmium, antimony and bismuth.

6. A soldering composition according to claim 1 in which the complex salt is triethylamino chlorostannate and in which at least one dehydrated halide of a metal selected from the group consisting of lead, cadmium, antimony and bismuth is further added.

FRITZ KÖHLER.
EDUARD ROUETTE.
WILHELM STANDOP.